United States Patent [11] 3,612,987

| [72] | Inventors | Eugene A. Placke;<br>Claude D. Stegall, both of Houston, Tex. |
|---|---|---|
| [21] | Appl. No. | 27,943 |
| [22] | Filed | Apr. 13, 1970 |
| [23] | | Division of Ser. No. 806,758, Sept. 11, 1968,<br>Continuation-in-part of Ser. No. 504,567. |
| [45] | Patented | Oct. 12, 1971 |
| [73] | Assignee | AMF Incorporated |

[54] INSPECTION APPARATUS FOR MOVING ELONGATED ARTICLES INCLUDING MEANS FOR EXTENDING AND RETRACTING A SENSOR RELATIVE TO THE ARTICLE
8 Claims, 20 Drawing Figs.

| [52] | U.S. Cl. | 324/37 |
| [51] | Int. Cl. | G01r 33/12 |
| [50] | Field of Search | 324/37 |

[56] References Cited
UNITED STATES PATENTS
3,202,914  8/1965  Deem et al. .................. 324/37
3,299,350  1/1967  Tompkins et al. ............ 324/37

*Primary Examiner*—Rudolph V. Rolinec
*Assistant Examiner*—R. J. Corcoran
*Attorneys*—George W. Price and John H. Gallagher ABSTRACT: This application discloses apparatus for inspecting pipe or like tubular articles, particularly magnetic flux leakage type inspection of ferromagnetic pipe. The pipe is moved axially through rotating inspection apparatus which includes a magnetizer having diametrically opposed pole pieces to produce rotating circumferential flux. Shoe assemblies bearing upon the pipe contain transducers responsive to flux leakage caused by flaws in the pipe. Rotary solenoid and linkage mechanisms are disclosed for suspending the shoes and to provide retracted or engaged positions. The magnetizer pole pieces are adjustable to accommodate pipe of varying sizes.

INVENTORS
EUGENE A. PLACKE
CLAUDE D. STEGALL
BY John H. Gallagher
ATTORNEY

INVENTORS
EUGENE A. PLACKE
BY CLAUDE D. STEGALL

*John H. Gallagher*
ATTORNEY

INVENTORS
EUGENE A. PLACKE
CLAUDE D. STEGALL

BY *John H. Gallagher*

ATTORNEY

*INVENTORS*
EUGENE A. PLACKE
BY CLAUDE D. STEGALL

John H. Gallagher
ATTORNEY

INSPECTION APPARATUS FOR MOVING ELONGATED ARTICLES INCLUDING MEANS FOR EXTENDING AND RETRACTING A SENSOR RELATIVE TO THE ARTICLE

This application is a division of copending application Ser. No. 806,758, filed Sept. 11, 1968, which is a continuation-in-part of application Ser. No. 504,567, filed Oct. 24, 1965.

In the manufacture of drill pipe or the like, the joints of pipe are preferably inspected just after forming in rough billets, prior to finishing steps. In billet form, the pipe sections often have rough ends, usually belled out, although these ends are cropped off at a later manufacturing stage. The rough ends hamper the inspection operation due to possible damage to the scanning shoes which are used to detect flaws.

Pipe inspection is accomplished by moving the pipe axially through a rotating inspection device which contains a magnetizer that produces circumferential magnetic flux in the pipe, and flaws are detected by search coils in shoes mounted on the rotor. The movement of the pipe should not be stopped as it would disrupt the flow of pipe through the mill, and the detector shoes must be retracted to clear the rough ends of the pipe joints while still scanning almost the entire length of the pipe joint. The power operated mechanisms for extending and retracting the shoes must operate rapidly and positively, and since these devices rotate with the inspection assembly, it is preferable that weight is a minimum and a simple, rugged construction is provided.

In the preferred embodiment of the present invention the rotating inspection apparatus finds particular utility in the high-speed inspecting of tubular goods, such as steel pipe, after the pipe is formed in a steel mill. The inspection apparatus takes the form of a rotor through which the rough formed pipe billet is rapidly conveyed and the pipe billet is inspected for defects and imperfections by an inspecting device which rotates with the rotor. Thus, the inspection apparatus is preferably mounted in the conveyor line of a steel mill along which rough billet pipe is conveyed from the piercing station to the first machining operation. It is important that the pipe be tested in its rough billet form so that defective pipe can be immediately rejected before additional operations are performed on the pipe.

During forming of the pipe, the billet is heated and is pierced in this heated condition. As a result of such piercing, the ends of the pipe are quite rough and uneven and sometimes have relatively large, sharp edges which project radially or axially from adjacent ends of a length of billet pipe. However, the surface of the pipe beginning at perhaps a few inches from each end of the pipe is relatively smooth and provides a substantially constant diameter cylindrical surface. Rough billet pipe can be rapidly tested with inspection apparatus having delicate search shoes by conveying the pipe through the inspection apparatus at a rapid rate while maintaining the search shoes in a retracted position spaced from the pipe during the time the leading or trailing ends of the pipe billet pass between the search shoes, and by extending the search shoes to a position closely adjacent or engaging the relatively smooth surface of the pipe billet between the portions of the ends where ragged projections frequently are found. Hence, the search shoes are operated to engage the pipe after the first several inches of the leading end of the pipe or article has passed between the search shoes. The search shoes then remain adjacent to the surface of the pipe until just before the trailing end of the pipe passes between the shoes, whereupon the shoes are lifted to avoid damage to the shoes by the trailing end of the pipe. The preferred inspection apparatus is in the form of an apparatus for ferromagnetic inspection for flaws and imperfections, the apparatus including a rotor on which the inspection shoes are mounted so that the inspection shoes traverse a helical path around a pipe as it is moved axially through the apparatus. Since the inspection shoes must be closely adjacent to the peripheral surface of the pipe during testing to obtain accurate results, the mounting arrangement for the inspection shoes is quite critical.

Means for extending and contracting the shoes by mechanisms powered by pneumatic pistons are known in the art but the apparatus associated therewith is rather complex and bulky because it includes among other things complicated linkages to the pneumatic pistons, compressors, drive means for the compressors, and lubricating means for the pneumatic system. Because the above-described pneumatic system must be rotated about an axis along which a pipe is to pass in order to avoid the requirement for troublesome rotary fluid joints and seals, it is seen that such a system will indeed involve considerable complexity and bulk that must be included in a rotating mechanism.

In accordance with one important feature of this invention, the inspection shoes are provided with unique mounting arrangements which assure accurate and uniform test results and also provide for retracting and extending the search shoes in proper timed relation with the travel of a pipe billet through the inspection apparatus. The shoes are retracted and extended by power operated devices that include rotary electric solenoids.

In addition, the inspection apparatus is adjustable to test various sizes of pipe and other articles up to perhaps 24" or greater in diameter. Therefore, the opening in the rotor through which the pipe is passed during testing must be at least as great as the largest diameter of pipe to be tested. Correspondingly, the search shoes are mounted on adjustable supporting brackets which permit adjusting the shoes radially of the axis of the rotor to accommodate large diameter pipe. Also, according to an important feature of the invention, the pole pieces for the magnetizer in the rotor are adjustable to position the pole tips closely adjacent, but not engaging, the pipe.

Another significant feature of the inspection apparatus of this invention is its fail-safe operation. In order to prevent damage to the delicate shoes of the inspection apparatus in the event of an electric power failure the shoes and their associated mounting and operating apparatus are so arranged that the shoes automatically retract from engagement with the pipe.

The invention may be understood by reference to the following detailed description when read in conjunction with the accompanying drawings, wherein.

Figure 1:
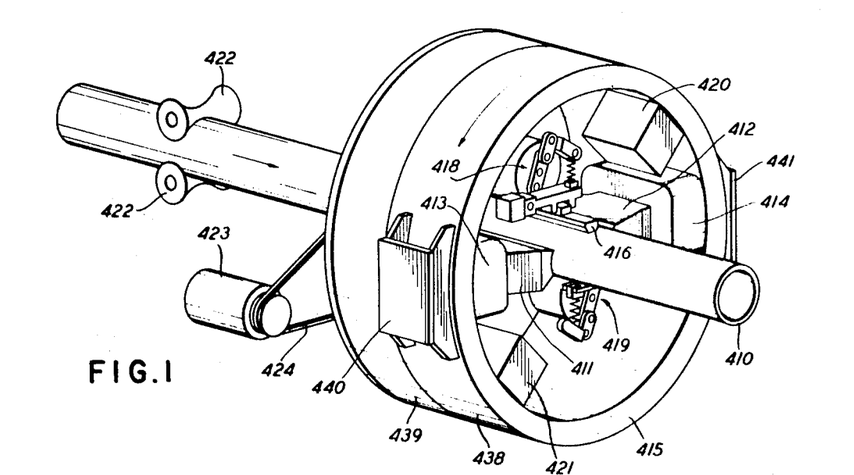
FIG. 1 is a pictorial view of the pipe inspection apparatus of this invention.

With reference now to FIG. 1, drill pipe inspection apparatus according to a preferred embodiment of the invention using a shoe suspension arrangement employing rotary solenoids is illustrated in schematic form. A section or joint of drill pipe 410 or like tubular goods is fed through a rotating inspection assembly including a magnetizer having pole pieces 411 and 412 around which coils 413 and 414 are wound. The remainder of the magnetic structure is made up of a large cylindrical iron assembly 415 which provides the return path for magnetic flux generated by the winding 413 and 414. Magnetic flux coupled into one side of the pipe 410 by the pole piece 411 flows in two parallel paths through the walls of the pipe and into the pole piece 412. The inspection technique used in the invention is based upon perturbations of the flux in the pipe wall as may be caused by flaws, cracks, voids, or the like in the metal pipe, these anomalies causing leakage of the flux into the space surrounding the outer surface of the pipe. This flux leakage is detected by transducers such as search coils located within elongated detector shoes 416 and 417. The detector shoes are positioned to bear upon the outer surface of the pipe 410, or may be retracted to a position to clear the pipe, this movement being accomplished by shoe suspension assemblies 418 and 419 for the shoes 416 and 417, respectively.

The shoe suspension assembly is an important feature of the invention and will be described in detail below. Control circuitry for operating the shoe suspension assemblies, as well as preamplifiers and other circuitry for the transducers located within the detector shoes, is contained within the casings 420 and 421 which rotate with the assembly The pipe 410 is moved through the rotating assembly by a roller arrangement such as pinch rollers 422 of which there would usually be several sets to accommodate long joints of pipe, while the size of the pinch rollers would be variable to accommodate several sizes of pipe, just as set forth above. At least one of the sets of rollers 422 would be powered to move the pipe through the rotating inspection assembly. The assembly including the detector shoes, the magnetizer, and the cylinder 415 are rotated by a suitable power arrangement which may include an electric motor 423 along with a pulley and belt 424 which would engage a pulley on the back of the cylinder 415. Thus, as the pipe 410 is moved through the central part of the rotating assembly, the inspection arrangement rotates about the pipe so that the detector shoes 416 and 417 scan helical paths along the pipe. Usually the rotating assembly would turn at a speed of perhaps 200 or 300 r.p.m. or more, while the pipe 410 would move at perhaps 150 to 300 feet per minute, or more.

Figure 2:
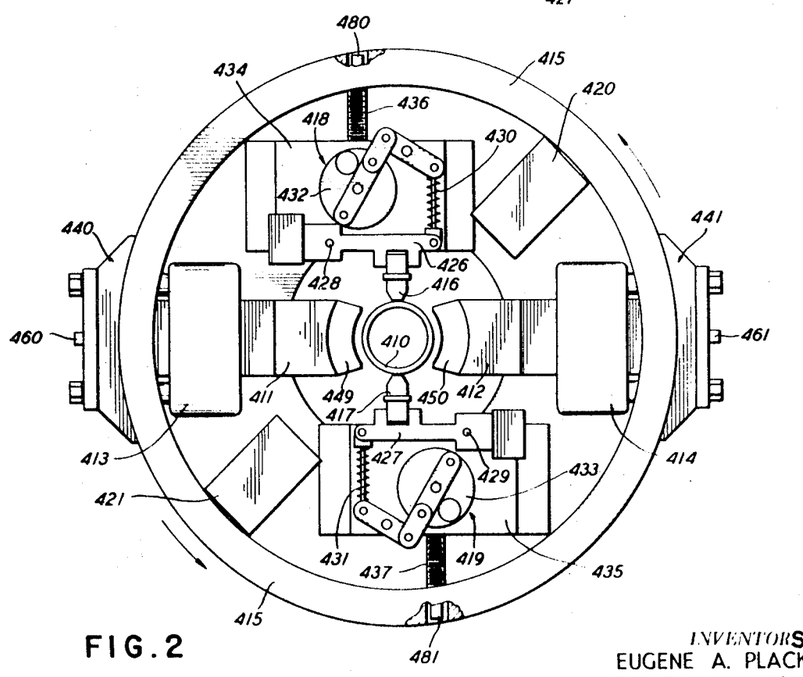
FIG. 2 is an elevation end view of the apparatus of FIG. 1.

Referring to FIG. 2, the entire rotating assembly may be seen in more detail. It may be noted that the shoe suspension assemblies 418 and 419 include arms 426 and 427 upon which the detector shoes 416 and 417 are mounted. These arms are pivotally mounted to rotate about picot points 428 and 429, and the arms are urged toward pipe by spring arrangements 430 and 431 along with mechanical linkages connected to the shafts of rotary solenoids 432 and 433. These shoe suspension assemblies are secured to frames 434 and 435 which may be adjusted vertically, i.e., radially, by arrangements including threaded shafts 436 and 437. This suspension arrangement will be described in detail with reference to FIGS. 8-13 below.

Figure 3:
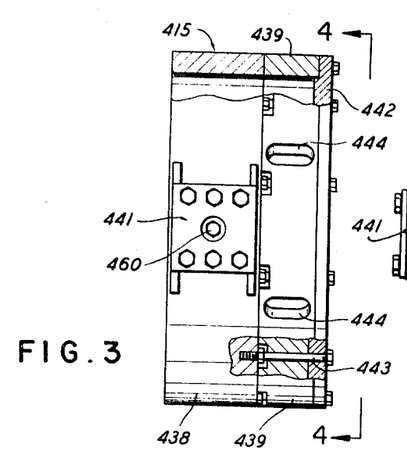
FIG. 3 is a side view in elevation, partly broken away, of the frame and magnetic structure in the apparatus of FIGS. 1 and 2.
Figure 4:
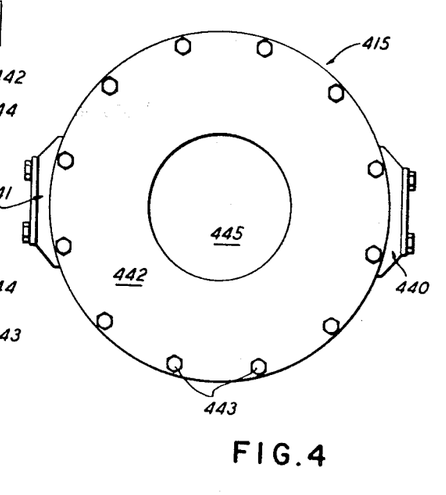
FIG. 4 is an end view of the apparatus of FIG. 3.

The magnetic structure including the generally cylindrical member 415 includes forward and rear rings 438 and 439 as may be seen in more detail in FIG. 3, the magnetizer cores 411 being mounted onto the forward ring 438 by assemblies 440 and 441 as will be described. The rear ring 439 is preferably composed of nonmagnetic material such as aluminum, as is a rear disc-shaped plate 442, so that the magnetic field into and out of the pipe 410 will not be distorted. The rings 438 and 439 along with rear plate 442 are secured together by bolts 443 which pass into threaded bores in the front plate 438. The entire cylindrical assembly 415 including the front and rear rings and the rear plate is suitably suspended for rotation as indicated by means of a suitable bearing arrangement (not shown). Apertures 444 are provided in the rear ring to aid in discharge of the iron oxide dust, while the pipe 410 passes.

Figures 5, 6:
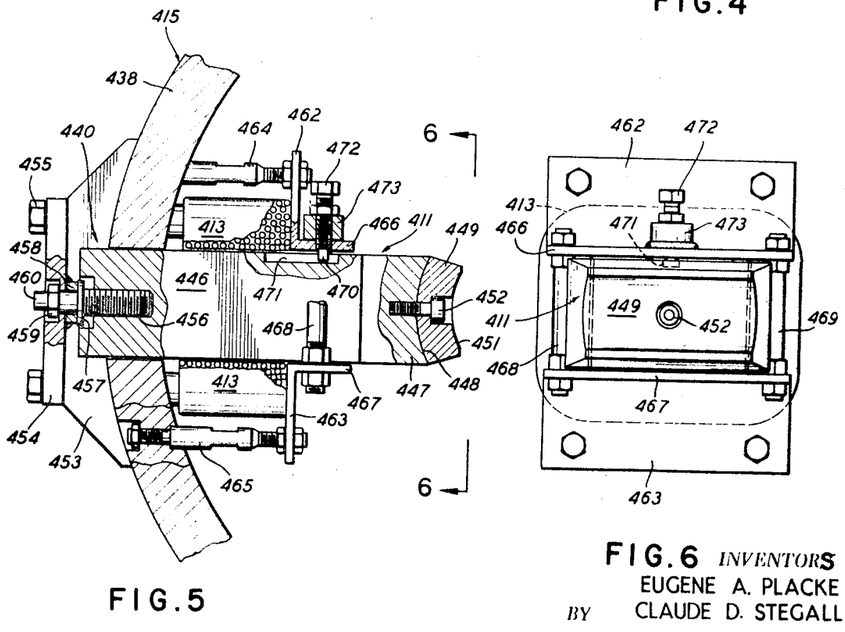
FIG. 5 is a detail view, partly in section and partly broken away, of the adjustable magnetic core structure of the apparatus of FIG. 2.
FIG. 6 is an end view of the core of FIG. 5.

Referring now to FIGS. 5 and 6, the mounting arrangement 440 for the magnetic core 411 is shown in detail, it being understood that the core 412 is similarly mounted. It is noted that the core 411 includes a main rectangular portion 446 which is surrounded by the coil 413, and includes a forward pole piece 447 having a curved outer face 448. A removable pole tip 449 is secured to the outer face 448. THe other magnetic assembly 412 also including a removable pole tip 450, see FIG. 2. The pole tip 449 includes a curved outer face 451 which has a shorter radius of curvature than the pole face 448. The purpose of this arrangement is to permit the use of this magnetic structure with pipes of varying diameter while providing some degree of match between the pole tip and the pipe. For large pipes, the pole tip 449 would be removed, it being held in place by a bolt 452, whereas for smaller pipes the pole tips 449 and 450 would be in place as shown so that the face 451 will more readily match the outer diameter of the pipe and also will require less movement of the central core 446. The pole tips do not touch the pipe but are spaced at an appropriate distance therefrom to accommodate changes in pipe diameter due to couplings, rough ends, etc.

The magnetic core 411 is movable in an axial direction with respect to the surrounding coil 413 to accommodate various pipe sizes by means of an assembly 440 as seen in FIG. 5. This assembly comprises a shoulder 453 mounted with a plate 454 on the outer side of the ring 438 by means including bolts 455. A threaded shaft 456 extends into a threaded central bore in the central part 446 of the core 411. This shaft 56 is held in a fixed position with respect to the plate 454 by a flange 457 engaging a ring 458 which is welded to the plate 454. A nut 459 on the outer end of the shaft 456 holds the assembly securely in place, while turning the outer end 460 of the shaft 456 causes the threaded shaft to turn with respect to the threaded bore in the core 446 and thus causes the face 451 of the pole tip to move in or out with respect to the pipe. The other core 412 is similarly adjusted by a shaft having an exposed end 461, seen in FIG. 2. The structures for holding the coil 413 and coil 414 in place are seen in detail in FIGS. 5 and 6. It is noted that the coil 413 does not move with respect to the ring 438 but instead the core 446 moves axially within the coil 413. The coil is held in place with respect to the ring 438 by a pair of flanged plates 462 and 463 using spacers 464 and 465 along with threaded screws and nuts as seen. The plates 462 and 463 will thus be fixed and will hold the windings of the cores 415 in place against the inner surface of the ring 438, while flanges 466 and 467 aid in supporting the central part 446 of the cores 411. The flanges 466 and 467 are held at spaced positions with respect to one another by shafts 468 and 469 which are threaded and include nets as seen. Thus, the flanges 466 and 467 do not bear tightly against the core 411 but instead permit the core to move. A shaft 470 positioned in a keyway 471 in the central part 446 of the cores 411 serves to hold the core in a fixed position or define its path of sliding movement. By turning a bolthead 472, the tip of the shaft 470 may be tightened or loosened with respect to the keyway 471, a structure 473 welded to the flange 466 providing the fixed threads as seen. To change the position of the magnetic core 411, first the bolt 472 would be loosened to free the shaft tip 470 in the keyway 471, then the shaft tip 460 would be turned to the proper position by a crank or wrench, after which the bolt 472 would be tightened to secure the magnetic core in place.

Figures 7, 8, 9, 10, 11:
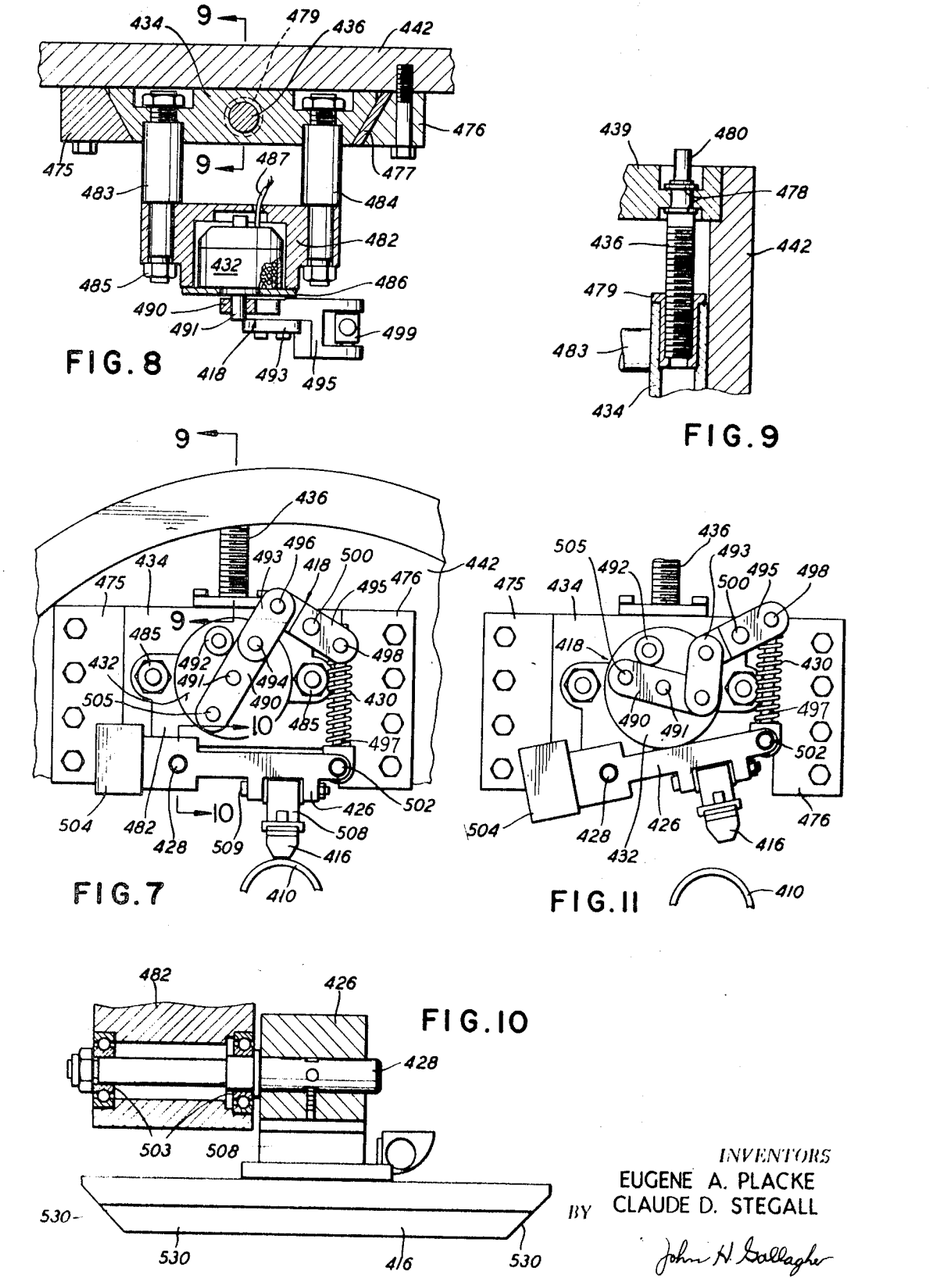
FIG. 7 is a detailed view of the shoe suspension arrangement used in the apparatus of FIG. 2.
FIG. 8 is a top view of the shoe suspension arrangement of FIG. 7.
FIG. 9 is a detail view in section of the vertical adjustment mechanism used for the shoe suspension arrangement, taken along the lines 9—9 in FIGS. 7 and 8.
FIG. 10 is a detail view in section of the pivot arrangement for the shoe suspension system of FIG. 7, taken along the line 10—10 in FIG. 7.
FIG. 11 is a view of the shoe suspension arrangement of FIG. 7 at a different operating condition, the shoe being lifted off of the pipe.
Figure 12:
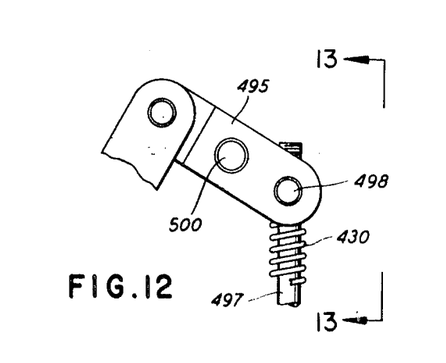
FIG. 12 is a detail view of the operating arm of the shoe suspension system of FIG. 7.

Referring now to FIGS. 7, 8, and 9, the assembly for adjusting the vertical position of the frame 434 for the shower suspension assembly 418 will be described. The frame 434 is mounted against the rear plate 442 in a dovetail arrangement by a pair of plates 475 and 476 which are held in fixed positions by bolts as seen. A brass shim 477 positioned in the dovetail arrangement between the slanted face of the plate 434 and the inwardly slanted face of plate 476 permits movement of the inner part readily with respect to the holding plate 475 and 476. This brass shim is used because of the tendency for the other parts, which are made of steel, to become magnetized and stick firmly together. To move the plate 434 vertically, the shaft 436 is permitted to turn with respect to the ring 439, FIG. 9, but is held with respect thereto by means of collars 478, while a threaded insert 479 in the plate 434 causes the plate 434 to move vertically when the shaft 436 is turned. An adjusting shaft 480 which is the end of the shaft 436 provides the external point for adjustment of the shoe suspension assembly to accommodate the various pipe diameters. A similar adjustment point 481, FIG. 2, is provided to turn the shaft 437 and thus change the position of the plate 435 for the shoe suspension assembly 419.

The shoe suspension assembly 418 is mounted on a frame 482 seen in FIGS. 7 and 8 which is positioned a fixed distance in front of the backplate 434 by spacers 483 and 484 along with suitable bolts and nuts 485. The rotary solenoid 432 is mounted within a recess in the frame 482 and held in place by a cover plate 486. An electrical cable 487 seen in FIG. 8 connects the solenoid to the instrument package 420 and thus through slip rings to the control panel.

The shoe suspension assembly seen in FIGS. 7-13, particularly in FIG. 7, includes a rotatable crank arm 490 which is connected in a fixed relationship to the shaft 491 so that when the shaft turns the crank arm 490 turns likewise. When the solenoid 432 is energized, crank arm 490 will be in the position shown in FIG. 7 against the right-hand side of a rubber bumper or stop 492, while when the solenoid coil is deenergized crank arm 490 rotates until it engages the lower left-hand side of the stop 492 as seen in FIG. 11. The solenoid 432 includes a coil spring to bias it to the clockwise position of FIG. 11. Crank arm 490 is coupled to the pivoted shoe support arm 426 which carries the detector shoe 416 by means of a linkage including a linking arm 493 connected to crank arm 490 by a picot pin 494, along with another arm 495 connected to linking arm 493 by a pivot pin 496. The arm 495 is connected to a rod 497 within the spring 430 at a pivot pin 498 which may be best seen in FIGS. 12 and 13. It is noted that the lower end of the arm 495 includes a forked portion to receive a rotatable insert 499 having a central bore slidably engaged by the rod 497. A nut on the threaded end of the rod 497 limits the downward movement of the rod, while the rod is urged downward by the action of the spring 430, forcing the detector shoe against the pipe. However, the rod 497 is free to move upward against the force of the spring if the detector shoe encounters any large perturbance on the pipe, or a change in pipe diameter occurs as at a coupling. The arm 495 is pivoted about a pin 500 which engages the frame 482. When in the operative position seen in FIG. 7, with the shoe 416 engaging the pipe 410, the angle of the arm 495 is such that the nut or stop on the upper end of the rod 497 does not touch the insert 499 but instead is slightly above the insert. In this manner, the shoe is permitted to move inward, as well as be deflected outward, and decreases in the pipe diameter below nominal are accommodated without the shoe being lifted away from the pipe.

The lower terminus of the rod 497 is connected at a pivot point 502 to one end of the shoe support arm 426 so that vertical movement of the rod 497 will cause like movement of the support arm 426. The end of the spring 430 bears against this pivot to urge support arm 426 downward. The pivot pin 428 for support arm 426 is fixed with respect to the arm and extends through a ball bearing arrangement 503 in the frame 482 as seen in FIG. 10 so that the pivot pin 428 is held firmly but yet is free to rotate with little friction. A counterweight 504 is positioned on the rear end of support arm 426 on the opposite side of the pivot point 428 to approximately balance the weight of support arm 426 and the shoe 416 to facilitate free and rapid movement of the arm taking into account the centrifugal force occurring when the assembly is rotating. Similarly a counterweight 505 is provided on the end of the arm 490 connected solenoid shaft 491 to balance rotation of the solenoid armature when the entire assembly is rotating and the linkage is subjected to centrifugal forces. This counterweight 505 may merely consist of a properly sized bolt threaded in to the end of the arm 490.

The detector show 416 is connected to the lower side of support arm 426 by means which include a pivoted bracket 508 connected by a pivot pin 509 to depending lugs on the arm 426. Thus the bracket 508 may pivot slightly with respect to support arm 426 permitting movement of the detector shoe 416 to account for irregularities in the pipe 410, these pivot members 508 and 509 being seen only in FIGS. 7 and 11.

Figure 18:
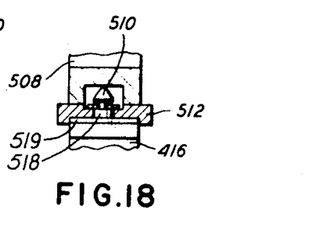
FIG. 18 is an elevation view in section similar to FIG. 16 showing the detector shoe in place within the holding assembly

Turning now to FIGS. 14–17, the arrangement for detachably securing the detector shoe 416 to the pivoted bracket 508 will be described. Mounted on the back of the detector shoe 416 is a headed pin 510 which fits through a hole 511 in a grooved support bracket 512 fixed on the lower end of the bracket 508 over a slot 513 into which the headed pin 510 is received. The pin is held in place by a securing device including a slidable fork member 514 which may be moved from left to right in view of FIG. 14 by a knob 515 containing thumb grips. The ends of the forked arms of the number 514 are chamfered so that they may be deflected past the reduced-diameter portion 516 of the headed pin 510. A lug 517 provides a stop for the forked member 514 and also permits the member 514 from being deflected upward. In addition a suitable locking device, not shown, may be employed to hold the member 514 securely in place. A shoulder 518 on the headed pin 510 fits fairly securely within the aperture 511 when the shoe is in place as seen in FIG. 18, and an upper plate portion 519 fits reasonably closely within the groove on the lower face of the bracket 512. In this manner, the detector shoe 416 is secured against yawing or rolling motions with respect to the mounting arrangement of with respect to the pipe 410, although some play is allowed i.e., the shoe is not held perfectly rigid but instead may move to follow deflections and irregularities in the pipe. Some play is permitted in a vertical direction in the view of FIG. 14, 16, or 18 if one end That is, if one end of the detector shoe 416 strikes an obstacle, not only will the bracket 508 rotate with respect to the pin 509, but also the plate 519 may rock slightly with respect to the groove in the face of the bracket 512, while the headed pin 510 moves vertically by a slight amount Of course the rod 497 may also move upward against the force of the spring 430 if the obstacle is large.

Figure 14:
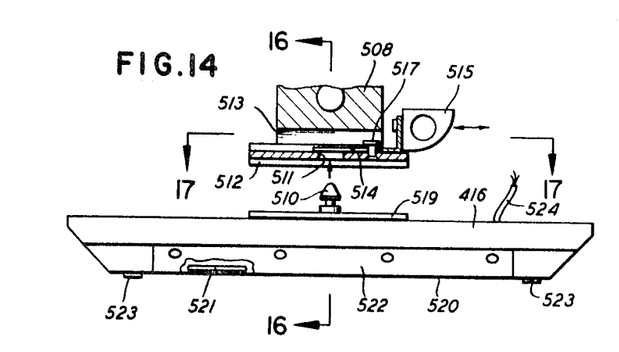
FIG. 14 is a detail view of the shoe mounting arrangement of the assembly of FIGS. 7-11.
Figure 15:
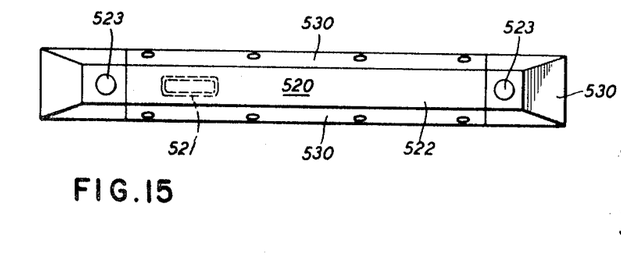
FIG. 15 is a bottom view of the inspection show of FIG. 14.
Figure 16:
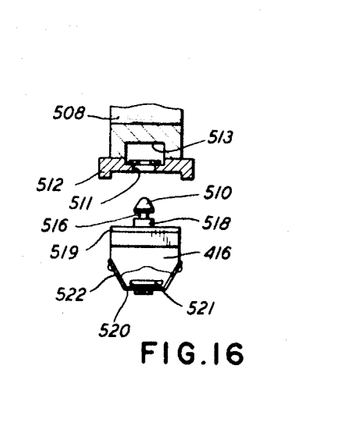
FIG. 16 is an end view of the assembly of FIG. 14, partly in section, taken along the line 16—16 in FIG. 14.
Figure 17:
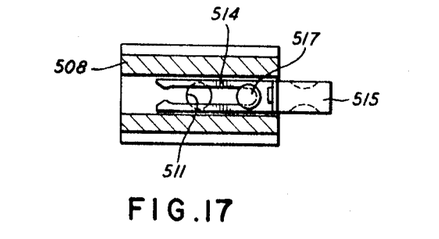
FIG. 17 is a detailed view in section of the fastening means used to hold the shoe of FIG. 14 on the suspension arrangement, taken along the line 17—17 in FIG. 14.

The elongated detector show 416 defines a flat front face 520 which is not curved in accordance with the curvature of the pipe. Thus, this detector show 416 can accommodate varying pipe diameters. Located within the shoe 16 are a plurality of search coils 521 which are protected by a stainless steel nonmagnetic plate or shim 522 but yet permitted to scan very close to the pipe surface for maximum sensitivity. A major part of the wear occasioned by bearing against the moving pipe is born by a pair of ceramic buttons 523, or members composed of other wear-resistance materials, which actually protrude only perhaps 5 mils beyond the surface of the shim 522. These buttons 523 are quite wear resistant and function to permit the search coils to be quite close to the workpiece but yet the shim is protected somewhat from abrasion.

Figure 19:
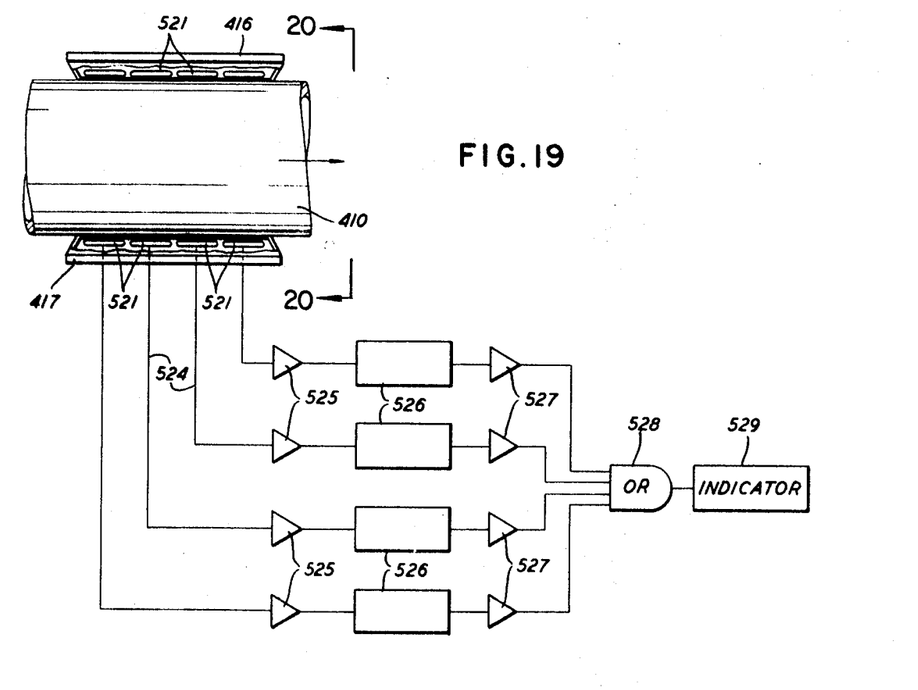
FIG. 19 is a schematic illustration of the electrical detector system utilized with the inspection assembly of the invention.
Figure 20:
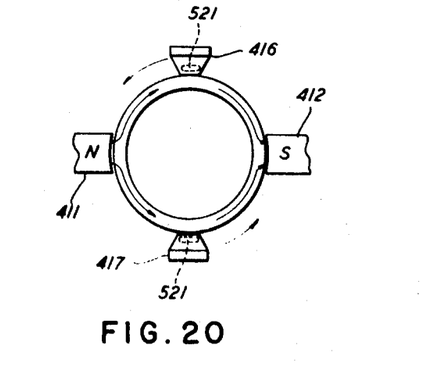
FIG. 20 is an end view of the inspection assembly of FIG. 19.

Referring to FIG. 19 and 20, a system for processing and indicating the flaw signals produced in the search coils 521 is illustrated. The shoes 416 and 417 along with the magnetizers including the cores 411 and 412 rotate with respect to the pipe 410, and so the magnetic flux produced by the magnetizers also rotates. However, a fixed amount of flux should be present in the vicinity of the search coils 521 at all times regardless of the rotation of the field unless a flaw, crack, void or like anomaly is present within the wall of the pipe. The pipe is usually composed of iron or steel having a high permeability and so little leakage will be present. However, a flaw extending radially and axially with respect to the pipe and cause leakage external to the pipe wall. Rotation of the search coils 521 through these flux perturbations generates electrical signals in the search coils, the signals being related in magnitude to the size of the flaw and also to the speed of rotation as well as to the spacing between the coil and the pipe. The outputs from the coils are connected by the cable 524 to the amplifier package 420 or 421 which contains preamplifiers 525, the output of which would be connected through slip rings to the nonrotating part of the system, that is to control console. Variable attenuators 526 would be used in the inputs to amplifiers 527 to adjust the gain of each channel to be exactly the same as all the others. The outputs of the amplifiers are all connected to an OR gate 528 and thus to a suitable indicator 529. A threshold device may be interposed at the input of the indicator so that only flaw signals of a certain magnitude are passed through to the indicator, noise being blocked. All of the search coils 521 in both of the shoes 416 and 417 would be coupled into the same OR gate 528 of FIG. 19, although only four are shown. Usually perhaps 20 or 40 channels would be present. This system is of course merely illustrative of the type of inspection system in which the mechanism of FIGS. 1–18 may be utilized.

In operation of the inspection system described above, the magnetizer cores 411 and 412 would first be adjusted in accordance with the diameter of the pipe 410 which is to be inspected. The pole tips 449 and 450 would be either left in place or removed depending upon the pipe diameter, and also the adjustment boltheads 460 and 461 would be turned to position the pole tips the proper distance from the pipe to provide a low-reluctance magnetic circuit but yet insure that the pole tips will clear protrusions and collars as may be present on the pipe. The shoe suspension assemblies 418 and 419 are also positioned in accordance with the pipe diameter by moving the sliding plates 434 and 435 through use of the adjusting heads 480 and 481 which turn the threaded shafts 436 and 437. The solenoids 432 and 433 will be initially in the deenergized conditions so that the shoes 415 and 417 will be raised off of the pipe as seen in FIG. 11. In this condition, the arm 495 will be in the counterclockwise position about the pivot point 500 as seen, the linking arm 493 pulling down on the left-hand end of the arm 495 since crank arm 490 will be rotated clockwise to engage the stop 492. The solenoid winding will be deenergized and the shaft 491 along with crank arm 490 will be held in this position by the spring which biases the arm of the solenoid. The motor 423 is energized to cause rotation of the entire inspection assembly, and so that apparatus is in condition to receive the pipe 410.

The pipe which is traveling along an axial path enters the inspection assembly, and as soon as the end of the pipe goes past the detector heads the solenoids 432 and 433 are energized to bring the detector shoes 416 and 417 into place bearing upon the surface of pipe 410. A sensing arrangement would be used for this purpose. As seen in FIG. 7, crank arm 490 will in this condition be rotated counterclockwise to engage the stop 492 and push up on the linking arm 493 which in turn rotates the arm 495 clockwise about the pivot point 500. This drives the shaft 497 downward and rotates shoe support arm 426 clockwise about the pivot point 428. It is noted that in this condition the pivot points 491, 494, and 496 are in substantially a straight line so that any tendency for the arm 495 to rotate as may be caused by vibration of the detector shoes due to roughness of the pipe surface will not be transmitted to the solenoids rotary motion. Nor will the "knee" of the arms 490 and 493 and the pivot 494 tend to buckle. Instead, the shaft 491 of the solenoid would be subjected to substantially linear forces rather than rotational forces. This linkage is such that the shoe 416 or support arm 426 do not transmit rotary motion to the armature of the solenoid, whereas rotation of the solenoid under its own power will cause movement of support arm 426 and shoe 416 in the path as seen in FIGS. 7 and 11. It therefore is seen in FIG. 7 that in the arrangement of the linkage provided by arms 490, 493, and 495 a locking effect is established in the linkage to maintain shoe 416 on pipe 410.

Figure 13:
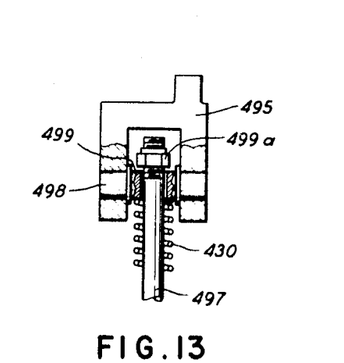
FIG. 13 is a detail view of the operating arm assembly of FIG. 12, partly broken away and in section, taken along the line 13—13 of FIG. 12.

With the shoes 416 and 417 engaging the pipe 410, the pipe is moved along an axial path from left to right through the assembly by rollers 422 or the like as seen in FIG. 1 while the search coils 521 scan the perturbations in the magnetic flux pattern as caused by flaws, cracks, and the like. Detected flaw signals picked up by coils 521 are indicated on the indicator device 529 seen in FIG. 19. It may be noted that when the shoes 416 and 417 strike protrusions or obstructions on the pipe they will bounce or deflect radially away from the pipe as permitted by the lost motion arrangement including the shaft 497 extending through the hole in the insert 499 as seen in FIG. 13, the spring 430 ordinarily forcing the shoe against the pipe. The shoes include starting faces 530 to facilitate riding over collars, protrusions, etc. on the pipe. The depth of the faces 530, FIG. 10, is much greater than the distance which the shoes are permitted to move inward from the nominal pipe diameter, i.e., the distance the nut on the top of the rod 497 rides above the insert 499, FIG. 13, so that if the shoe drops into a recess it will be deflected out rather than catch on the oncoming pipe.

It is understood that the apparatus of FIGS. 1–20 may be controlled automatically, as by a proximity detector to position the shoe suspension assemblies in response to pipe position.

The shoe suspension assembly used in FIG. 7 has certain important features which should be noted. The major pivoted axis of the shoes is noted to be parallel to the axis of the pipe, this pivotal axis being the pivot pin 428 in FIGS. 2, 7 and 9. This facilitates proper positioning of the shoes. Also, the construction of the shoe suspension assemblies permits the magnetizing cores to be positioned at the same area around the pipe, so that pole tips extend along the pipe parallel to and adjacent the detector shoes, producing an oven flux distribution at a high density at the actual inspection area. Another feature is that the shoes are spring biased against the pipe by the rod and spring assemblies 430 and 497 in FIGS. 12 and 13, which for nominal pipe diameter are positioned to permit movement of the shoes slightly inward to follow bends or dents, as well as outward against the action of the spring, but the inward movement is limited by the stops 499a on the ends of the rods. In this manner, the shoes follow the pipe surface, but will not be damaged upon dropping into large discontinuities, since the distance of movement permitted is less than the depth of the sloping faces of the shoes. An additional point of note is that the shoes are pivoted to permit a pitching motion on the pipe as needed when collars or other changes in pipe diameter are encountered, this pivoting action being provided by pin 509 of FIG. 7. In addition, the fact that the shoes are spring biased in their retracted positions rather than their extended positions is a fail-safe feature since loss of current to one of the solenoids will result in the shoe being retracted due to the coil spring within the rotary solenoid. The use of a rotary solenoid has several important advantages, a major one of which is that the coupling of electric power into the rotating assembly is much less complex then other known arrangements, and provides a light, inexpensive assembly. Shifting the entire suspension assembly for a change in pipe size renders the suspension dynamically constant regardless of pipe size , the assembly being shifted by the screws 436, 437 and plates 434 and 435. The suspension assemblies contain a lost-motion linkage so that chatter of the shoes on the pipe is not transmitted back to the solenoids; also the shoes are releasably connected to the suspension assembly so that they may be removed without dismantling the entire apparatus. The assemblies are counterweighted so that the speed of the rotor does not tend to retract the shoes or rotate the solenoid.

This inspection system has been described as utilizing search coils 521 as the transducers within the detector shoes 416 and 417. In place of these simple coils for detecting flux leakage, Hall effect devices may be utilized, or magnetometer devices also are suitable, these devices being responsive to flux magnitude rather than change of flux.

In addition, it will be appreciated that the retractable shoe suspension system and other features of the invention are applicable to inspection apparatus using flaw detectors of other types, such as ultrasonic devices or eddy current coils.

Instead of using only two detector shoes, it may be appropriate in inspecting large diameter pipes to use several pairs of detector shoe assemblies, and perhaps several pairs of adjustable pole pieces and suitable magnetizer structure.

We claim:

1. Inspection apparatus for inspecting elongated articles that pass along an axial path comprising,
   rotatable mounting means adapted to rotate coaxially about the axial path,
   an inspection device for inspecting said article for flaws and adapted to rotate with said mounting means about the axial path,
   a suspension assembly for mounting said inspection device on the mounting means and for extending the inspection device to a position adjacent the surface of an article on said axial path and for withdrawing the inspection device away from the surface of the article,
   said suspension assembly including,
   a pivoted support arm supporting said inspection device and rotatable about a first axis which is parallel to said axial path,
   a rotatable drive shaft extending parallel to said axial path,
   a crank arm secured to the drive shaft,
   means for rotating said drive shaft in opposite directions,
   an elongated pivot arm mounted for rotation at a point intermediate its two ends about a second axis parallel to said axial path,
   said drive shaft and said second axis being successively spaced farther from the axial path than said first axis,
   a linking arm pivotally joined at one of its ends to one end of said crank arm and pivotally joined at its other end to one end of said pivot arm,
   means including a connecting rod for resiliently connecting the other end of the pivot arm to an end of said support arm,
   stop means fixed in position with respect to said drive shaft for limiting the rotary motion of the crank arm to respective first and second limit positions when the crank arm rotates in opposite directions
   the positions of said drive shaft and said first and second axes being so arranged and the lengths of said arms and said rod being so proportioned that said crank arm and linking arm are aligned along a straight line and said other end of the pivot arm is rotated to a position closer to said axial path than said second axis when the crank arm is at its first limit position and said one end of the pivot arm is rotated to a position farther from said axial path than said second axis when the crank arm is rotated to its second limit position,
   whereby said inspection device is extended to a position adjacent the article on said axial path when the crank arm is at its first limit position and is withdrawn away from the article when the crank arm is in its second limit position.

2. The inspection apparatus claimed in claim 1 and further including,
   means carried by said mounting means for moving the suspension assembly radially toward ro away from the axial path.

3. The inspection apparatus claimed in claim 1 wherein said means for rotating said drive shaft is an electrical solenoid which is actuated on command to rotate the drive shaft to move the crank arm to either of its two limit positions 4. The inspection apparatus claimed in claim 3 wherein the inspection device includes
   means responsive to magnetic flux, and the inspection apparatus further includes
   first and second magnetic cores carried by said mounting means at circumferentially spaced positions about an axial path, said cores extending radially from the mounting means toward said axial path,
   said mounting means being of a magnetic material to complete a magnetic circuit between the two cores, and
   means for establishing a radially directed magnetic flux field in each of said magnetic cores.

5. The inspection apparatus claimed in claim 4 and further including
   means for adjusting the radial positions of said magnetic cores toward or away from the axial path.

6. The inspection apparatus claimed in claim 5 and further including
   a removable pole tip attached to the innermost end of each of said magnetic cores,
   each pole tip having a desired curvature to substantially conform to the surface of a cylindrical object that is to pass along the axial path to be inspected for flaws.

7. The inspection apparatus claimed in claim 6 wherein said means that is responsive to magnetic flux is carried in a shoe member which is adapted to engage the surface of the elongated article that passes along the axial path.

8. Inspection apparatus for inspecting elongated articles that pass along an axial path comprising
   means for moving an elongated article to be inspected along said path,
   an inspection device mounted adjacent said path for inspecting said article to determine a condition thereof,
   a suspension assembly for mounting said inspection device on the mounting means and for extending the inspection device to a position adjacent the surface of an article on said axial path and for withdrawing the inspection device away from the surface of the article,
   said suspension assembly including,
   a pivoted support arm supporting said inspection device and rotatable about a first axis which is parallel to said axial path,
   a rotatable drive shaft extending parallel to said axial path,
   a crank arm secured to the drive shaft,
   means for rotating said drive shaft in opposite directions,
   an elongated pivot arm mounted for rotating at a point intermediate its two ends about a second axis parallel to said axial path,
   a linking arm pivotally joined at one of its end to one end of said crank arm and pivotally joined at its other end to one end of said pivot arm,
   means including a connecting rod for resiliently connecting the other end of the pivot arm to an end of said support arm,
   stop means fixed in position with respect to said drive shaft for limiting the rotary motion of the crank arm to respective first and second limit positions when the crank arm rotates in opposite directions
   the positions of said drive shaft and said first and seconds axes being so arranged and the lengths of said arms and said rod being so proportioned that said crank arm and linking arm are aligned along a straight line and said other end of the pivot arm is rotated to a position closer to said axial path than said second axis when the crank arm is at its first limit position, and said one and of the pivot arm is rotated to a position farther from said axial path than said second axis when the crank arm is rotated to its second limit position,
   whereby said inspection device is extended to a position adjacent the article on said axial path when the crank arm is at its first limit position and is withdrawn away from the article when the crank arm is in its second limit position.